United States Patent
Lee et al.

(10) Patent No.: US 8,165,079 B2
(45) Date of Patent: Apr. 24, 2012

(54) SYSTEM AND METHOD FOR CONNECTION IDENTIFIER SYNCHRONIZATION IN A COMMUNICATION SYSTEM

(75) Inventors: Ok-Seon Lee, Suwon-si (KR);
Yeong-Moon Son, Yongin-si (KR);
Jae-Jeong Shim, Seongnam-si (KR);
Jong-Hyung Kwun, Seongnam-si (KR);
Geun-Hwi Lim, Seongnam-si (KR);
Jung-Hoon Cheon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 825 days.

(21) Appl. No.: 12/313,473

(22) Filed: Nov. 20, 2008

(65) Prior Publication Data

US 2009/0135805 A1     May 28, 2009

(51) Int. Cl.
*H04W 4/00* (2009.01)
*H04J 1/16* (2006.01)

(52) U.S. Cl. ......... 370/329; 370/328; 370/330; 370/235
(58) Field of Classification Search .................... 370/329
See application file for complete search history.

(56) References Cited

U.S. PATENT DOCUMENTS

| 7,944,919 | B2 * | 5/2011 | Connors et al. | 370/390 |
| 2005/0008012 | A1 * | 1/2005 | Koren et al. | 370/389 |
| 2005/0286407 | A1 * | 12/2005 | Park et al. | 370/208 |

* cited by examiner

*Primary Examiner* — Jeffrey Pwu
*Assistant Examiner* — Shaq Taha

(57) ABSTRACT

A method for synchronizing connection identifiers (CIDs) in a communication system includes sending a first message for requesting addition of a service flow identified by a CID; sending a second message and, at the same time, setting a number of a frame where the second message is transmitted as a first start frame number; sending a third message and, at the same time, setting a number of a frame where the third message is transmitted as a second start frame number; performing a modulo operation on a frame having the first or second start frame number and its succeeding frames using a positive integer for each frame, and detecting a number of a frame where a result value of the modulo operation becomes zero; and simultaneously updating CID lists at a frame having the detected frame number with regard to a CID of the added service flow.

12 Claims, 10 Drawing Sheets

SYSTEM AND METHOD FOR CONNECTION IDENTIFIER SYNCHRONIZATION IN A COMMUNICATION SYSTEM

CROSS-REFERENCE TO RELATED APPLICATION(S) AND CLAIM OF PRIORITY

The present application claims priority to application entitled "SYSTEM AND METHOD FOR CONNECTION IDENTIFIER SYNCHRONIZATION IN A COMMUNICATION SYSTEM," filed with the Korean Intellectual Property Office on Nov. 23, 2007 and assigned Serial No. 2007-0120372, the contents of which are incorporated herein by reference.

TECHNICAL FIELD OF THE INVENTION

The present application relates generally to a communication system and, in particular, to a system and method for Connection IDentifier (CID) synchronization between a mobile station (MS) and a base station (BS) in a communication system.

BACKGROUND OF THE INVENTION

In communication systems, a BS should rapidly allocate bandwidth in response to an uplink bandwidth allocation request from an MS. The uplink bandwidth allocation request is made based on CIDs of an MS, and the BS's bandwidth allocation in response thereto is achieved based on each MS. That is, an MS requests allocation of a bandwidth necessary for each individual CID, and a BS gathers the bandwidth requested for each individual CID and allocates the gathered bandwidths to corresponding MS independently.

The CID is allocated to each MS through addition/deletion of a service flow. The term 'service flow' as used herein means a connection for data transmission/reception by an MS, and while the addition of a service flow is called Dynamic Service Addition (DSA), the deletion of a service flow is called Dynamic Service Deletion (DSD).

With reference to FIGS. 1A to 1D, a description will now be made of a DSA/DSD procedure between an MS and a BS in a general communication system.

FIG. 1A is a diagram illustrating an MS-initiated DSA procedure in a general communication system.

Referring to FIG. 1A, an MS 101 sends to a BS 103 a Dynamic Service Addition REQuest (DSA-REQ) message including a service parameter for a service flow it will add in order to add a new service flow (step 110). Upon receipt of the DSA-REQ message, the BS 103 sends a Dynamic Service Addition ReceiVeD (DSA-RVD) message to the MS 101 (step 112), notifying that it has normally received the DSA-REQ message and is handling the received message.

The BS 103 adds a CID caused by the service flow addition, requested by the MS 101 (step 114), and adds the CID even to its own MS CID list to update the CID list. Thereafter, the BS 103 sends the result to the MS 101 through a Dynamic Service Addition ReSPonse (DSA-RSP) message (step 116). Upon receipt of the DSA-RSP message, the MS 101 adds a corresponding CID, and adds the corresponding CID even to its own CID list to update the CID list. Thereafter, the MS 101 sends to the BS 103 a Dynamic Service Addition ACKnowledgement (DSA-ACK) message for acknowledging the addition of the corresponding CID (step 118).

FIG. 1B is a diagram illustrating a BS-initiated DSA procedure in a general communication system.

Referring to FIG. 1B, if addition of a new CID is detected, a BS 107 adds the CID to its own MS CID list to update the CID list (step 120), and sends to an MS 105 a DSA-REQ message for requesting service flow addition for the added CID (step 122). Upon receipt of the DSA-REQ message, the MS 105 adds a CID caused by the service flow addition and adds the CID even to its own CID list to update the CID list. Thereafter, the MS 105 sends the result to the BS 107 through a DSA-RSP message (step 124). Upon receipt of the DSA-RSP message, the BS 107 sends to the MS 105 a DSA-ACK message for acknowledging the MS's addition of the CID (step 126).

FIG. 1C is a diagram illustrating an MS-initiated DSD procedure in a general communication system.

Referring to FIG. 1C, an MS 109 sends to a BS 111 a Dynamic Service Deletion REQuest (DSD-REQ) message including an IDentifier (ID) of a service flow that it will delete in order to delete the existing service flow (step 130). Upon receipt of the DSD-REQ message, the BS 111 deletes a CID corresponding to the service flow that the MS 109 has requested to delete (step 132), deletes the CID from its own MS CID list to update the CID list, and then sends the result to the MS 109 through a Dynamic Service Deletion ReSPonse (DSD-RSP) message (step 134). Upon receipt of the DSD-RSP message, the MS 109 deletes a corresponding CID, and deletes the corresponding CID even from its own CID list to update the CID list.

FIG. 1D is a diagram illustrating a BS-initiated DSD procedure in a general communication system.

Referring to FIG. 1D, if deletion of an existing CID is detected (step 140), a BS 115 deletes the CID from its own MS CID list to update the CID list, and sends to an MS 113 a DSD-REQ message for requesting service flow deletion for the deleted CID (step 142). Upon receipt of the DSD-REQ message, the MS 113 deletes a corresponding CID, deletes the corresponding CID even from its own CID list to update the CID list, and then sends the result to the BS 115 through a DSD-RSP message (step 144).

That is, in the communication system, the MS is allocated a corresponding CID through the DSA/DSD process, and the MS and BS update their own CID lists. However, since the BS updates its CID list at the time its own CID is added/deleted, and the MS updates its CID list at the time it is allocated a CID from the BS, the CID lists of the MS and BS may not be identical temporarily. In addition, because the messages exchanged between the BS and the MS in the DSA/DSD process may be lost or may suffer an error, the CID lists of the MS and BS may not be identical to each other. Therefore, it is not possible to immediately withdraw the unused CID(s) and allocate it to another service flow, making it difficult to efficiently manage a limited number of CIDs.

SUMMARY OF THE INVENTION

To address the above-discussed deficiencies of the prior art, it is a primary aspect of the present invention to address at least the problems and/or disadvantages and to provide at least the advantages described below. Accordingly, the present invention provides a system and method for CID synchronization between an MS and a BS.

Further, the present invention provides a system and method for simultaneously updating CID lists of an MS and a BS.

According to one aspect of the present invention, there is provided a method for synchronizing Connection IDentifiers (CIDs) of a first station and a second station in a communication system. The CID synchronization method includes sending, by the first station, a first message for requesting addition of a service flow identified by a CID to the second station; sending, by the second station, a second message which is a response message to the first message, and at the same time, setting a number of a frame where the second message is transmitted as a first start frame number; sending, by the first station, a third message for acknowledging receipt of the second message to the second station, and at the same time, setting a number of a frame where the third message is transmitted as a second start frame number; performing, by each of the first station and the second station, a modulo operation on a frame having the first or second start frame number and its succeeding frames using a positive integer for each frame, and detecting a number of a frame where a result value of the modulo operation becomes zero (0); and simultaneously updating CID lists of the first station and the second station at a frame having the detected frame number with regard to a CID of the added service flow.

According to another aspect of the present invention, there is provided a method for synchronizing Connection IDentifiers (CIDs) of a first station and a second station in a communication system. The CID synchronization method includes sending, by the first station, a first message for requesting deletion of a service flow identified by a CID to the second station, and at the same time, setting a number of a frame where the first message is transmitted as a first start frame number; sending, by the second station, a second message which is a response message to the first message, and at the same time, setting a number of a frame where the second message is transmitted as a second start frame number; performing, by each of the first station and the second station, a modulo operation on a frame having the first or second start frame number and its succeeding frames using a positive integer for each frame, and detecting a number of a frame where a result value of the modulo operation becomes zero (0); and simultaneously updating CID lists of the first station and the second station at a frame having the detected frame number with regard to a CID of the deleted service flow.

According to further another aspect of the present invention, there is provided a system for synchronizing Connection IDentifiers (CIDs) in a communication system. The CID synchronization system includes a first station and a second station. The first station sends a first message for requesting addition of a service flow identified by a CID to the second station. The second station sends a second message which is a response message to the first message, and at the same time, sets a number of a frame where the second message is transmitted as a first start frame number. The first station sends a third message for acknowledging receipt of the second message to the second station, and at the same time, sets a number of a frame where the third message is transmitted as a second start frame number. The first station and the second station each perform a modulo operation on a frame having the first or second start frame number and its succeeding frames using a positive integer for each frame, and detect a number of a frame where a result value of the modulo operation becomes zero (0). The first station and the second station simultaneously update CID lists of the first station and the second station at a frame having the detected frame number with regard to a CID of the added service flow.

According to yet another aspect of the present invention, there is provided a system for synchronizing Connection IDentifiers (CIDs) in a communication system. The CID synchronization system includes a first station and a second station. The first station sends a first message for requesting deletion of a service flow identified by a CID to the second station, and at the same time, sets a number of a frame where the first message is transmitted as a first start frame number. The second station sends a second message which is a response message to the first message, and at the same time, sets a number of a frame where the second message is transmitted as a second start frame number. The first station and the second station each perform a modulo operation on a frame having the first or second start frame number and its succeeding frames using a positive integer for each frame, and detect a number of a frame where a result value of the modulo operation becomes zero (0). The first station and the second station simultaneously update CID lists of the first station and the second station at a frame having the detected frame number with regard to a CID of the deleted service flow.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Preferred embodiments of the present invention will now be described in detail with reference to the annexed drawings. In the following description, a detailed description of known functions and configurations incorporated herein has been omitted for clarity and conciseness.

The present invention provides a system and method for CID synchronization between an MS and a BS. Further, the present invention provides a system and method for simultaneously updating CID lists of an MS and a BS.

Figure 1A:
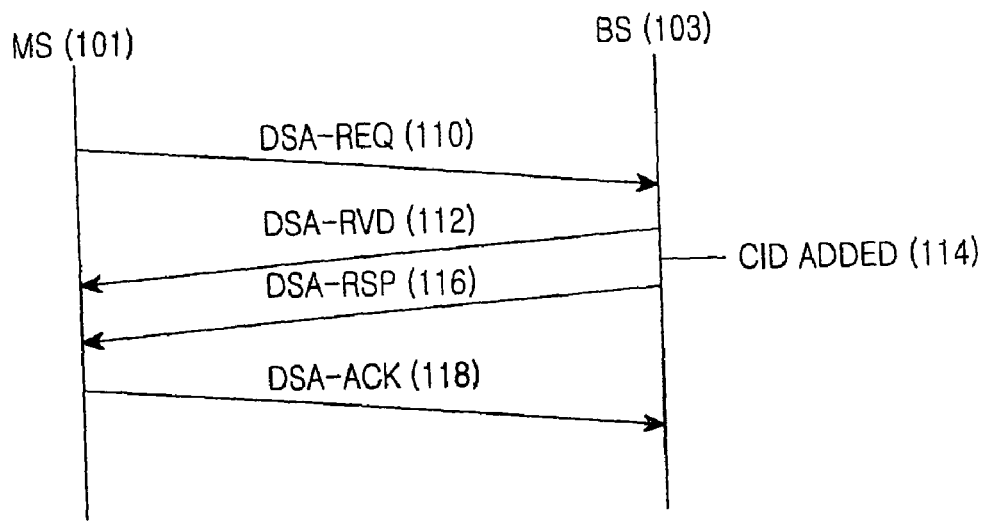
FIGS. 1A to 1D are diagrams illustrating a DSA/DSD procedure between an MS and a BS in a general communication system.
Figure 1B:
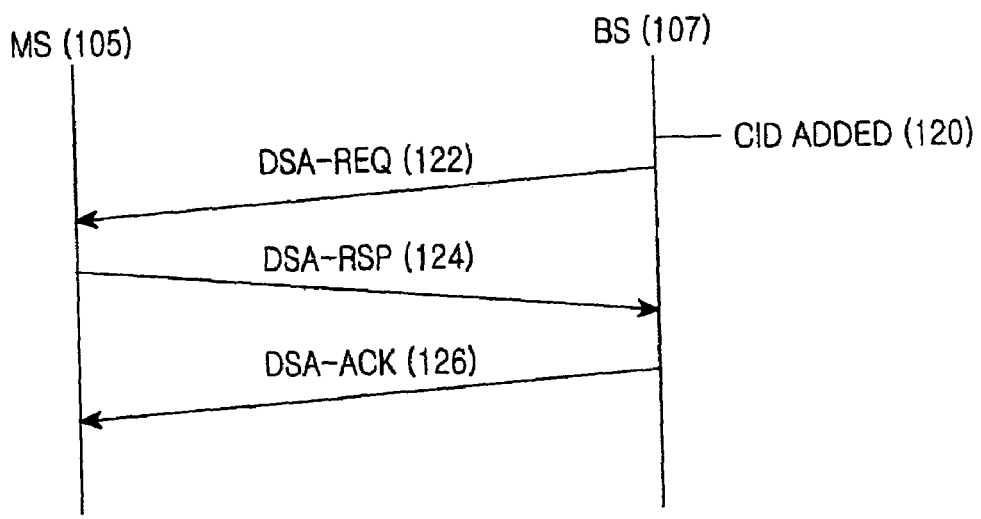
Figure 1C:
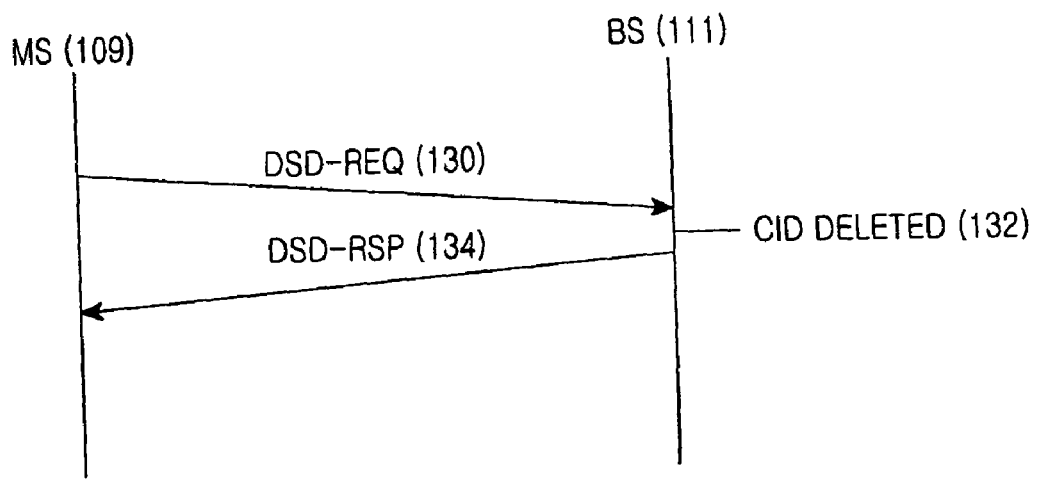
Figure 1D:
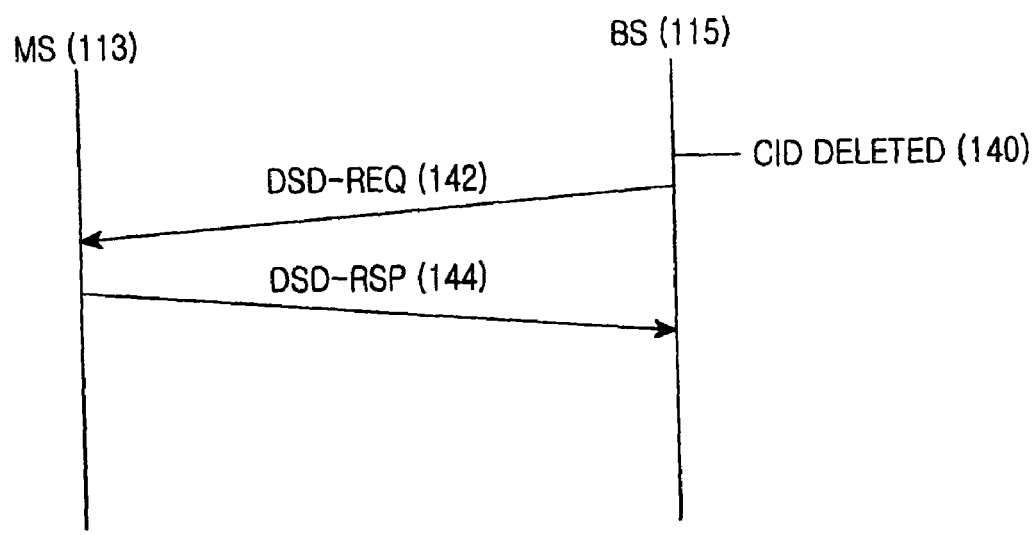
Figure 2:
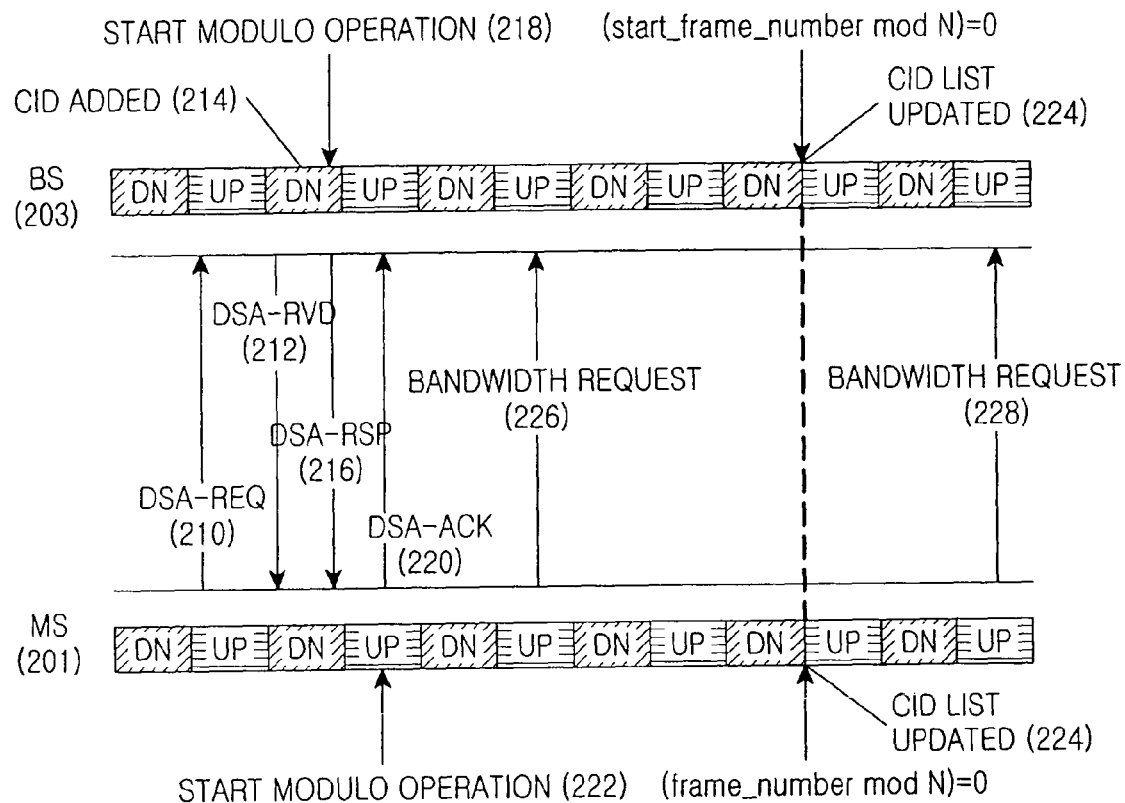
FIG. 2 is a diagram illustrating an MS-initiated DSA procedure in a communication system according to a first embodiment of the present invention.

FIG. 2 is a diagram illustrating an MS-initiated DSA procedure in a communication system according to a first embodiment of the present invention.

Referring to FIG. 2, in order to add a new service flow, an MS 201 sends to a BS 203 a DSA-REQ message including a service parameter for a service flow it will add (step 210). Upon receipt of the DSA-REQ message, the BS 203 sends a DSA-RVD message to the MS 201 (step 212), notifying that it has normally received the DSA-REQ message and is handling the received message. The BS 203 adds a CID caused by the service flow addition requested by the MS 201 (step 214), and then sends the result to the MS 201 through a DSA-RSP message (step 216). At the same time, the BS 203 sets a number of a frame where the DSA-RSP message is transmitted as a start frame number start_frame_number, and then starts a modulo operation (step 218).

Meanwhile, upon receipt of the DSA-RSP message, the MS 201 sends to the BS 203 a DSA-ACK message for acknowledging receipt of the DSA-RSP message (step 220). At the same time, the MS 201 sets a number of a frame where the DSA-ACK message is transmitted, as a start frame number, and then starts a modulo operation (step 222). That is, the BS 203 and the MS 201 perform a modulo operation on every frame with a preset value N and detect a frame number of a frame where a result value of the modulo operation becomes 0. Thereafter, if a length of a frame interval from the start frame number to the detected frame number exceeds a threshold, the BS 203 and the MS 201 simultaneously update their own CID lists at the frame corresponding to the detected frame number (step 224).

However, if the length of the frame interval from the start frame number to the detected frame number is less than or equal to the threshold, the BS 203 and the MS 201 lack the time required for a CID list update and a round robin delay time. Therefore, if the length of the frame interval is greater than or equal to the threshold, the BS 203 and the MS 201 re-set the detected frame number as a start frame number and then perform a modulo operation. Thereafter, as described above, the BS 203 and the MS 201 detect a frame number of the frame where a result value of the modulo operation becomes 0, and simultaneously update their own CID lists at the frame corresponding to the detected frame number.

If a CID-related operation (for example, an uplink bandwidth request of the MS 201) occurs after step 224 (step 228), the MS 201 and the BS 203 perform relevant operations using their updated CID lists. However, if an uplink bandwidth request of the MS 201 occurs before step 224 (step 226), the MS 201 and the BS 203 perform relevant operations using their non-updated CID lists (for the CID included in the non-updated CID lists) and perform relevant operations independently of the non-updated CID lists for the CID added by the service flow addition.

Figure 3:
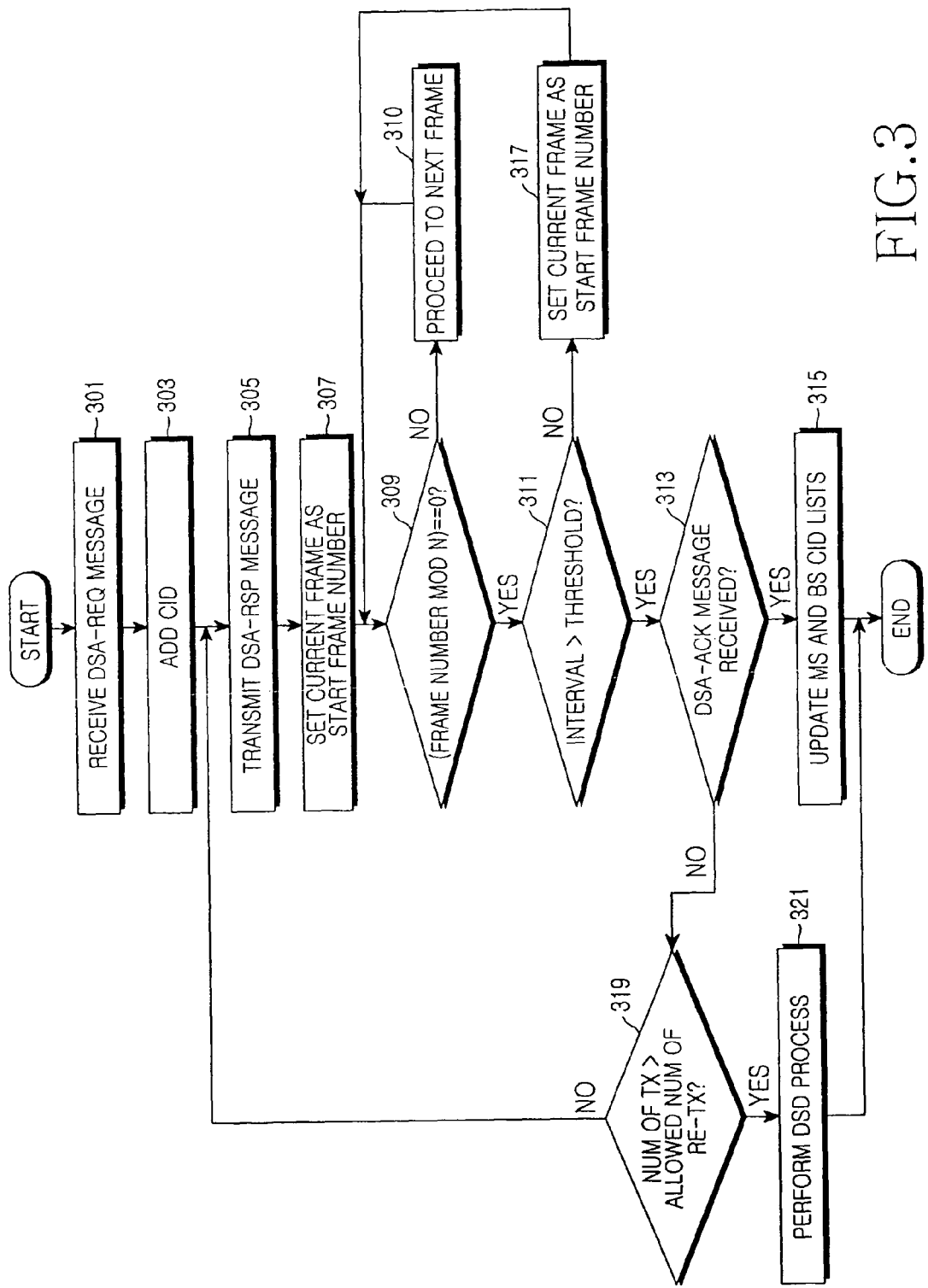
FIG. 3 is a flowchart illustrating an MS-initiated DSA procedure for updating a CID list in a communication system according to the first embodiment of the present invention.

FIG. 3 is a flowchart illustrating an MS-initiated DSA procedure for updating a CID list in a communication system according to the first embodiment of the present invention.

Referring to FIG. 3, in step 301, a BS receives from an MS a DSA-REQ message for requesting the addition of a new service flow. In step 303, the BS adds a CID caused by the service flow addition requested by the MS. In step 305, the BS sends a DSA-RSP message to the MS. In step 307, the BS sets a number of the current frame, or a frame where the DSA-RSP message is transmitted, as a start frame number.

In step 309, the BS determines if a result value obtained by performing a modulo operation on a first frame having the set start frame number with a preset value N is 0, and if the result value obtained by performing a modulo operation on the first frame with the value N is not 0, the BS proceeds to a second frame or the next frame of the first frame (step 310), where it repeats step 309. If a result value obtained by performing a modulo operation on the second frame with the value N is 0, the BS proceeds to step 311.

In step 311, the BS determines if a length of a frame interval from the first frame to the second frame where the result value obtained by performing the modulo operation thereon is 0 exceeds a threshold, and if the length of the frame interval exceeds the threshold, the BS proceeds to step 313. However, if the length of the frame interval is less than or equal to the threshold, the BS proceeds to step 317 where it re-sets a number of the second frame as a start frame number. Thereafter, the BS returns to step 309 where it repeats step 309 for the frame having the re-set start frame number.

In step 313, the BS determines if it has received a DSA-ACK message from an MS, and if a DSA-ACK message is received, the BS proceeds to step 315 where the MS and the BS simultaneously update their CID lists. However, if the BS does not receive a DSA-ACK message from the MS in step 313, it proceeds to step 319.

In step 319, the BS detects the number of times it has transmitted the DSA-RSP message, and determines if the number of DSA-RSP message transmissions exceeds the allowed number of DSA-RSP message retransmissions previously set in the system. If it is determined in step 319 that the number of times the BS has transmitted the DSA-RSP message exceeds the allowed number of DSA-RSP message retransmissions previously set in the system, the BS proceeds to step 321 where it performs a DSD process. However, if the number of times the BS has transmitted the DSA-RSP message is less than or equal to the allowed number of DSA-RSP message retransmissions previously set in the system, the BS proceeds to step 305.

In FIG. 3, an exemplary operation has been described in which a BS performs a modulo operation and detects a frame where the BS and the MS will simultaneously update their CID lists. However, in order for the BS and the MS to simultaneously update their CID lists, not only the BS but also the MS should perform a modulo operation and detect a frame where it will update its CID list. The MS's modulo operation is started at the time the MS sends the DSA-ACK message or a response to the DSA-RSP message received from the BS, and since an operation in which the MS performs a modulo operation and detects a frame where it will update its CID list is similar to the above-described operation in which the BS performs a modulo operation and detects a frame where it will update its CID list, a detailed description thereof will be omitted herein.

Figure 4:
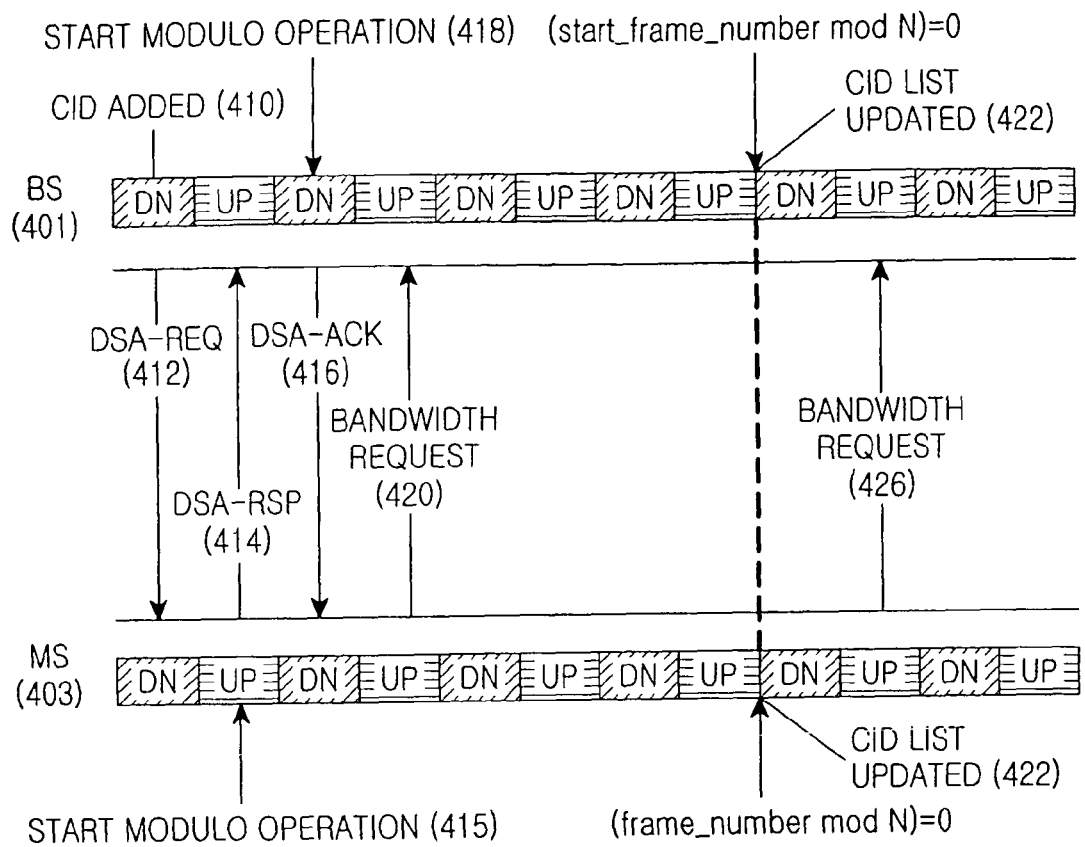
FIG. 4 is a diagram illustrating a BS-initiated DSA procedure in a communication system according to a second embodiment of the present invention.

FIG. 4 is a diagram illustrating a BS-initiated DSA procedure in a communication system according to a second embodiment of the present invention.

Referring to FIG. 4, if a new CID is added (step 410), a BS 401 sends to an MS 403 a DSA-REQ message for requesting addition of a service flow for the added CID (step 412). After adding the CID caused by the service flow addition, the MS 403 sends the result to the BS 401 through a DSA-RSP message (step 414). At the same time, the MS 403 sets a number of a frame where the DSA-RSP message is transmitted as a start frame number, and then starts a modulo operation (step 415).

Meanwhile, upon receipt of the DSA-RSP message, the BS 401 sends to the MS 403 a DSA-ACK message for acknowledging receipt of the DSA-RSP message (step 416). At the same time, the BS 401 sets a number of a frame where the DSA-ACK message is transmitted, as a start frame number, and then starts a modulo operation (step 418). That is, the BS 401 and the MS 403 perform a modulo operation on every frame with a preset value N and detect a frame number of a frame where a result value of the modulo operation becomes 0. Thereafter, if a length of a frame interval from the start frame number to the detected frame number exceeds a threshold, the BS 401 and the MS 403 simultaneously update their own CID lists at the frame corresponding to the detected frame number (step 422).

However, if the length of the frame interval from the start frame number to the detected frame number is less than or equal to the threshold, the BS 401 and the MS 403 lack the time required for a CID list update and a round robin delay time. Therefore, if the length of the frame interval is less than or equal to the threshold, the BS 401 and the MS 403 re-set the detected frame number as a start frame number, and then perform a modulo operation. Thereafter, as described above, the BS 401 and the MS 403 detect a number of the frame where a result value of the modulo operation becomes 0, and simultaneously update their own CID lists at the frame corresponding to the detected frame number.

If an uplink bandwidth request from the MS 403 occurs after step 422 (step 426), the MS 403 and the BS 401 perform relevant operations using their updated CID lists. However, if the uplink bandwidth request from the MS 403 occurs before step 422 (step 420), the MS 403 and the BS 401 perform relevant operations using the non-updated CID lists for the CID included in the non-updated CID lists, and perform relevant operations independently of the non-updated CID lists for the CID added by the service flow addition.

Figure 5:
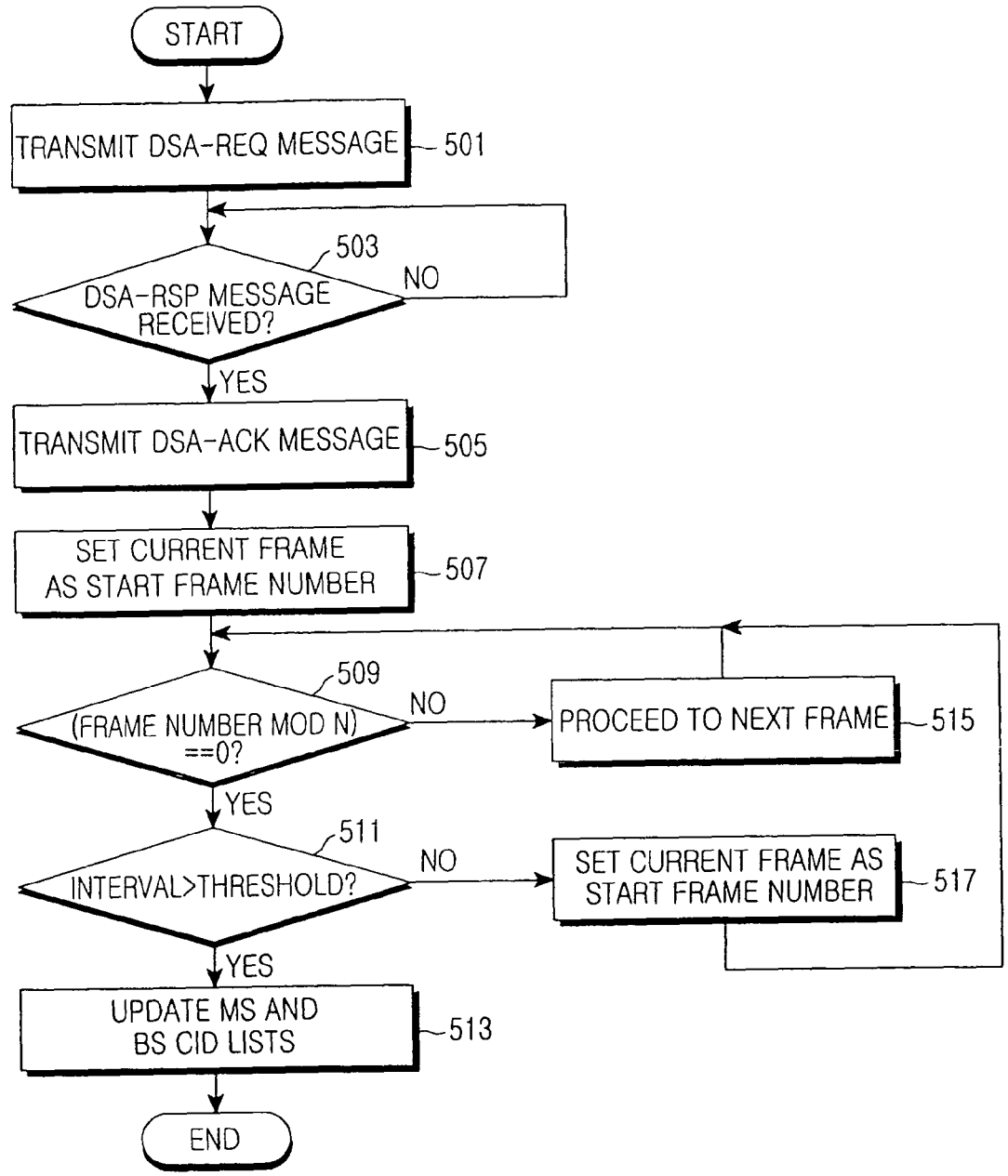
FIG. 5 is a flowchart illustrating a BS-initiated DSA procedure for updating a CID list in a communication system according to a third embodiment of the present invention.

FIG. 5 is a flowchart illustrating a BS-initiated DSA procedure for updating a CID list in a communication system according to a third embodiment of the present invention.

Referring to FIG. 5, if a new CID is added, a BS sends to an MS a DSA-REQ message for requesting the addition of a service flow for the added CID in step 501. In step 503, the BS determines if it has received a DSA-RSP message from the MS, and upon receipt of the DSA-RSP message, the BS proceeds to step 505 where it sends to the MS a DSA-ACK message for acknowledging receipt of the DSA-RSP message.

In step 507, the BS sets a number of the current frame, or a frame where the DSA-ACK message is transmitted, as a start frame number. In step 509, the BS determines if a result value obtained by performing a modulo operation on a first frame having the set start frame number with a preset value N is 0, and if the result value obtained by performing a modulo operation on the first frame with the value N is not 0, the BS proceeds to a second frame or the next frame of the first frame (step 515), where it performs step 509. However, if the result value obtained by performing a modulo operation on the second frame with the value N is 0, the BS proceeds to step 511.

In step 511, the BS determines if a length of a frame interval from the first frame to the second frame where the result value obtained by performing the modulo operation is 0 exceeds a threshold, and if the length of the frame interval is less than or equal to the threshold, the BS proceeds to step 517 where it re-sets a number of the second frame as a start frame number. Thereafter, the BS proceeds to step 509 where it performs step 509 for the frame having the re-set start frame number.

However, if it is determined in step 511 that the length of the frame interval exceeds the threshold, the BS proceeds to step 513 where the MS and the BS simultaneously update their CID lists.

In FIG. 5, an exemplary operation has been described in which a BS performs a modulo operation and detects a frame where the BS and the MS will simultaneously update their CID lists. However, in order for the BS and the MS to simultaneously update their CID lists, not only the BS but also the MS should perform a modulo operation and detect a frame where it will update its CID list. The MS's modulo operation is started at the time the MS sends the DSA-RSP message to the BS, and since an operation in which the MS performs a modulo operation and detects a frame where it will update its CID list is similar to the above-described operation in which the BS performs a modulo operation and detects a frame where it will update its CID list, a detailed description thereof will be omitted herein.

Figure 6:
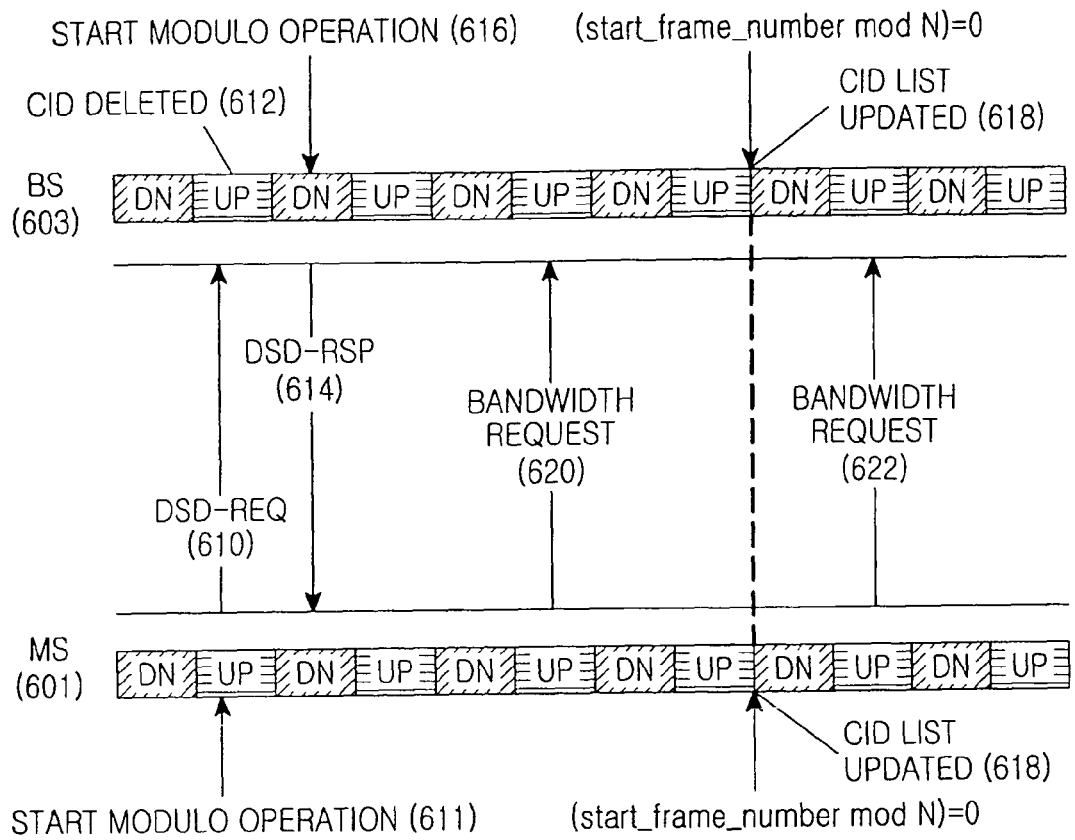
FIG. 6 is a diagram illustrating an MS-initiated DSD procedure in a communication system according to the third embodiment of the present invention.

FIG. 6 is a diagram illustrating an MS-initiated DSD procedure in a communication system according to the third embodiment of the present invention.

Referring to FIG. 6, in order to delete an existing service flow, an MS 601 sends to a BS 603 a DSD-REQ message including an ID of a service flow that it will delete (step 610). The MS 601 sets a number of a frame where the DSD-REQ message is transmitted as a start frame number, and then starts a modulo operation (step 611).

Meanwhile, the BS 603 deletes a CID as a result of the service flow deletion requested by the MS 601 (step 612), and then sends the result to the MS 601 through a DSD-RSP message (step 614). At the same time, the BS 603 sets a number of the frame where the DSD-RSP message is transmitted as a start frame number, and then starts a modulo operation (step 616). That is, the BS 603 and the MS 601 perform a modulo operation on every frame with a preset value N and detect a frame number of a frame where a result value of the modulo operation becomes 0. Thereafter, if a length of a frame interval from the start frame number to the detected frame number exceeds a threshold, the BS 603 and the MS 601 simultaneously update their own CID lists at the frame corresponding to the detected frame number (step 618).

However, if the length of the frame interval from the start frame number to the detected frame number is less than or equal to the threshold, the BS 603 and the MS 601 lack the time required for a CID list update and a round robin delay time. Therefore, if the length of the frame interval is less than or equal to the threshold, the BS 603 and the MS 601 re-set the detected frame number as a start frame number, and then perform a modulo operation. Thereafter, as described above, the BS 603 and the MS 601 detect a frame number of the frame where a result value of the modulo operation becomes 0, and simultaneously update their own CID lists at the frame corresponding to the detected frame number.

If an uplink bandwidth request of the MS 601 occurs after step 618 (step 622), the MS 601 and the BS 603 perform relevant operations using their updated CID lists. However, if the uplink bandwidth request occurs before step 618 (step 620), the MS 601 and the BS 603 perform relevant operations using their non-updated CID lists for the CID included in the non-updated CID lists, and perform relevant operations independently of the non-updated CID lists for the CID deleted by the service flow deletion.

Figure 7:
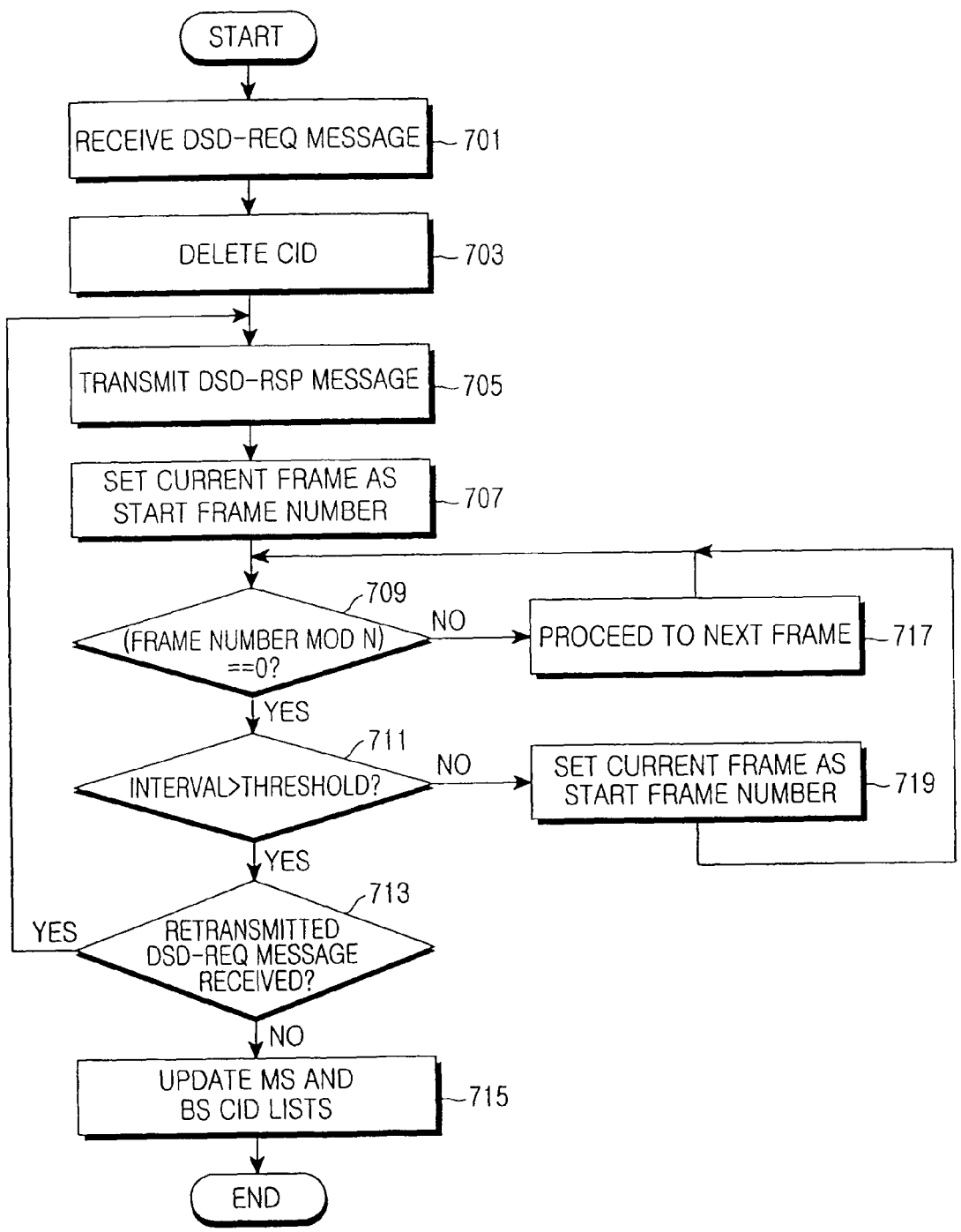
FIG. 7 is a flowchart illustrating an MS-initiated DSD procedure for updating a CID list in a communication system according to the third embodiment of the present invention.

FIG. 7 is a flowchart illustrating an MS-initiated DSD procedure for updating a CID list in a communication system according to the third embodiment of the present invention.

Referring to FIG. 7, in step 701, a BS receives from an MS a DSD-REQ message including an ID of a service flow that it will delete from the existing service flow. In step 703, the BS deletes a CID indicated by the service flow ID included in the DSD-REQ message. In step 705, the BS sends a DSD-RSP message to the MS. In step 707, the BS sets a number of the current frame, or a frame where the DSD-RSP message is transmitted, as a start frame number.

In step 709, the BS determines if a result value obtained by performing a modulo operation on a first frame having the set start frame number with a preset value N is 0, and if the result value obtained by performing a modulo operation on the first frame with the value N is not 0, the BS proceeds to a second frame or the next frame of the first frame (step 717), where it performs step 709. However, if the result value obtained by performing a modulo operation on the second frame with the value N is 0, the BS proceeds to step 711.

In step 711, the BS determines if a length of a frame interval from the first frame to the second frame where the result value obtained by performing the modulo operation is 0, exceeds a threshold, and if the length of the frame interval exceeds the threshold, the BS proceeds to step 713. However, if the length of the frame interval is less than or equal to the threshold, the BS proceeds to step 719 where it re-sets a number of the second frame as a start frame number. Thereafter, the BS proceeds to step 709 where it performs step 709 for the frame having the re-set start frame number.

In step 713, the BS determines if it has received a DSD-REQ message retransmitted from the MS, and if a retransmitted DSD-REQ message is not received, the BS proceeds to step 715 where the MS and the BS simultaneously update their CID lists. However, upon receipt of the retransmitted DSD-REQ message, the BS proceeds to step 705 where it sends a DSD-RSP message.

In FIG. 7, an exemplary operation has been described in which a BS performs a modulo operation and detects a frame where the BS and the MS will simultaneously update their CID lists. However, in order for the BS and the MS to simultaneously update their CID lists, not only the BS but also the MS should perform a modulo operation and detect a frame where it will update its CID list. The MS's modulo operation is started at the time the MS sends the DSD-REQ message to the BS, and since an operation in which the MS performs a modulo operation and detects a frame where it will update its CID list is similar to the above-described operation in which the BS performs a modulo operation and detects a frame where it will update its CID list, a detailed description thereof will be omitted herein.

Figure 8:
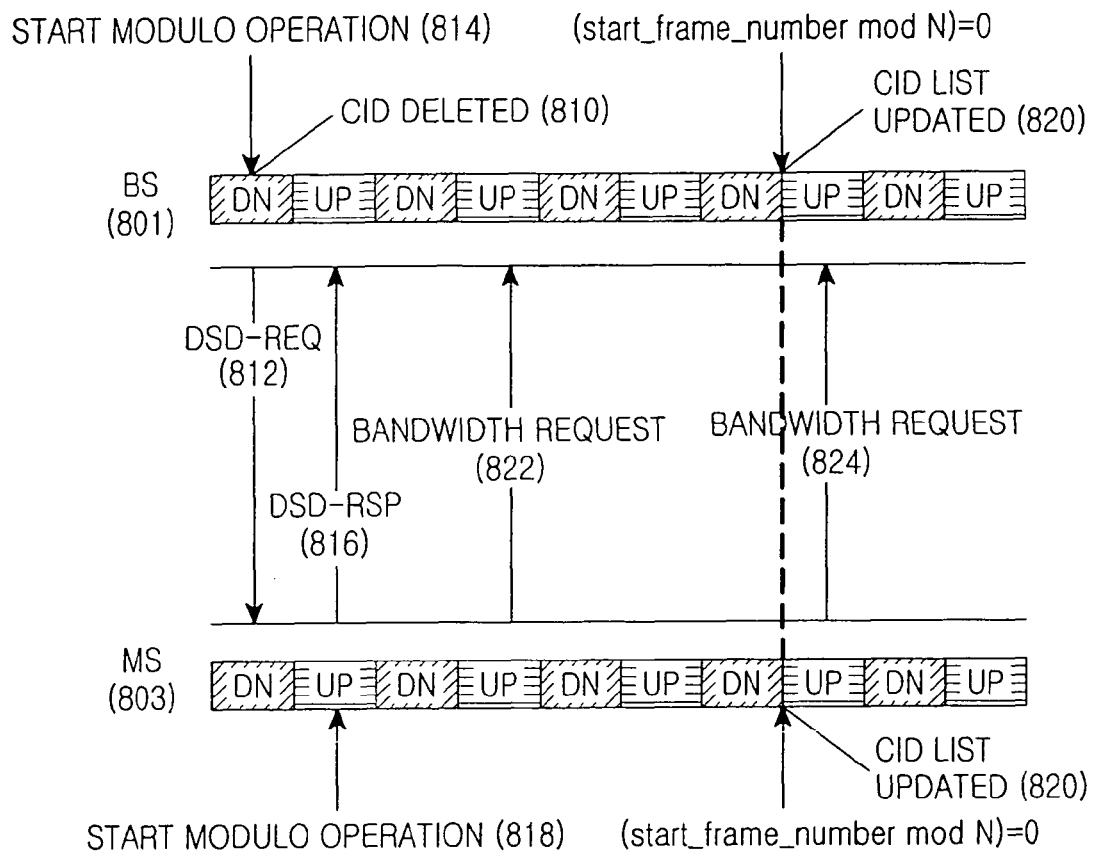
FIG. 8 is a diagram illustrating a BS-initiated DSD procedure in a communication system according to a fourth embodiment of the present invention.

FIG. 8 is a diagram illustrating a BS-initiated DSD procedure in a communication system according to a fourth embodiment of the present invention.

Referring to FIG. 8, if an existing CID is deleted (step 810), a BS 801 sends to an MS 803 a DSD-REQ message for requesting the deletion of a service flow for the deleted CID (step 812). At the same time, the BS 801 sets a number of a frame where the DSD-REQ message is transmitted, as a start frame number, and then starts a modulo operation (step 814). After deleting the CID as a result of the service flow deletion, the MS 803 sends the result to the BS 801 through a DSD-RSP message (step 816). At the same time, the MS 803 sets a number of the frame where the DSD-RSP message is transmitted, as a start frame number, and then starts a modulo operation (step 818). That is, the BS 801 and the MS 803 perform a modulo operation on every frame with a preset value N and detect a frame number of the frame where a result value of the modulo operation becomes 0. Thereafter, if a length of a frame interval from the start frame number to the detected frame number exceeds a threshold, the BS 801 and the MS 803 simultaneously update their own CID lists at the frame corresponding to the detected frame number (step 820).

However, if the length of the frame interval from the start frame number to the detected frame number is less than or equal to the threshold, the BS 801 and the MS 803 lack the time required for a CID list update and a round robin delay time. Therefore, if the length of the frame interval is less than or equal to the threshold, the BS 801 and the MS 803 re-set the detected frame number as a start frame number, and then perform a modulo operation. Thereafter, as described above, the BS 801 and the MS 803 detect a frame number of the frame where a result value of the modulo operation becomes 0, and simultaneously update their own CID lists at the frame corresponding to the detected frame number.

If an uplink bandwidth request of the MS 803 occurs after step 820 (step 824), the MS 803 and the BS 801 perform relevant operations using their updated CID lists. However, if the uplink bandwidth request of the MS 803 occurs before step 820 (step 822), the MS 803 and the BS 801 perform relevant operations using their non-updated CID lists for the CID included in the non-updated CID lists, and perform relevant operations independently of the non-updated CID lists for the CID deleted by the service flow deletion.

Figure 9:
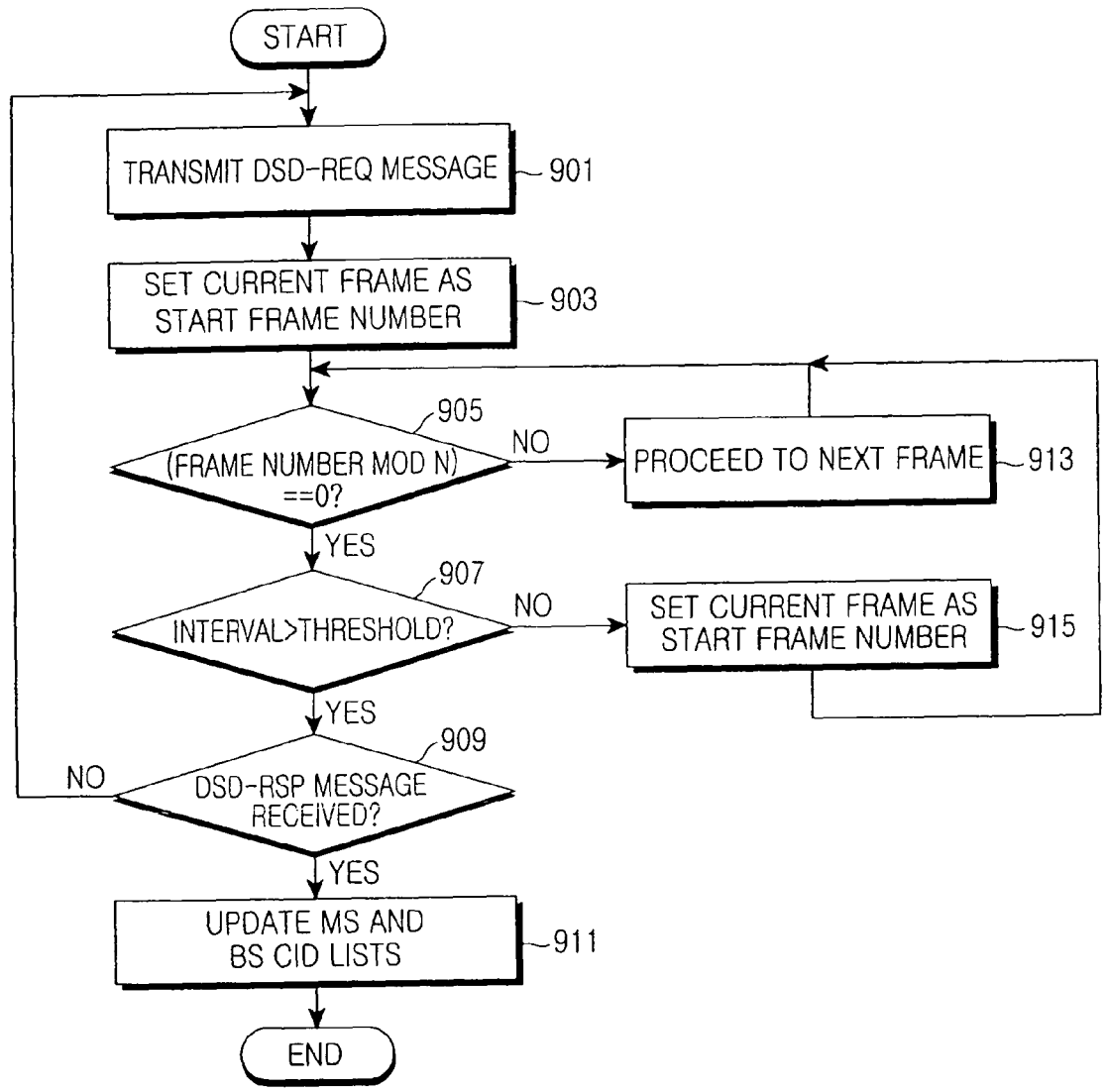
FIG. 9 is a flowchart illustrating a BS-initiated DSD procedure for updating a CID list in a communication system according to the fourth embodiment of the present invention.

FIG. 9 is a flowchart illustrating a BS-initiated DSD procedure for updating a CID list in a communication system according to the fourth embodiment of the present invention.

Referring to FIG. 9, if an existing CID is deleted, a BS sends to an MS a DSD-REQ message for requesting the deletion of a service flow for the deleted CID in step 901. In step 903, the BS sets a number of the current frame, or a frame where the DSD-REQ message is transmitted, as a start frame number.

In step 905, the BS determines if a result value obtained by performing a modulo operation on a first frame having the set start frame number with a preset value N is 0, and if the result value obtained by performing a modulo operation on the first frame with the value N is not 0, the BS proceeds to a second frame or the next frame of the first frame (step 913), where it performs step 905. However, if the result value obtained by performing a modulo operation on the second frame with the value N is 0, the BS proceeds to step 907.

In step 907, the BS determines if a length of a frame interval from the first frame to the second frame where the result value obtained by performing the modulo operation is 0, exceeds a threshold, and if the length of the frame interval is less than or equal to the threshold, the BS proceeds to step 915 where it re-sets a number of the second frame as a start frame number. Thereafter, the BS proceeds to step 905 where it performs step 905 for the frame having the re-set start frame number. However, if it is determined in step 907 that the length of the frame interval exceeds the threshold, the BS proceeds to step 909.

In step 909, the BS determines if it has received a DSD-RSP message from the MS, and upon receipt of a DSD-RSP message, the BS proceeds to step 911 where the MS and the BS simultaneously update their CID lists. However, upon failure to receive the DSD-RSP message, the BS proceeds to step 901 where it retransmits the DSD-REQ message.

In FIG. 9, an exemplary operation has been described in which a BS performs a modulo operation and detects a frame where the BS and the MS will simultaneously update their CID lists. However, in order for the BS and the MS to simultaneously update their CID lists, not only the BS but also the MS should perform a modulo operation and detect a frame where it will update its CID list. The MS's modulo operation is started at the time the MS sends the DSD-RSP message to the BS, and since an operation in which the MS performs a modulo operation and detects a frame where it will update its CID list is similar to the above-described operation in which the BS performs a modulo operation and detects a frame where it will update its CID list, a detailed description thereof will be omitted herein.

As is apparent from the foregoing description, for CID synchronization between an MS and a BS, the present invention performs a modulo operation on every frame and simultaneously updates CID lists of the MS and the BS according to a detected arbitrary period, thereby making it possible to immediately withdraw the unused CID(s) and allocate it to another service flow. As a result, it is possible to efficiently manage a limited number of CIDs.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for synchronizing Connection IDentifiers (CIDs) of a first station and a second station in a communication system, the method comprising:
   sending, by the first station, a first message for requesting an addition of a service flow identified by a connection identifier to the second station;
   sending, by the second station, a second message which is a response message to the first message, and at the same time, setting a number of a frame where the second message is transmitted as a first start frame number;
   sending, by the first station, a third message for acknowledging receipt of the second message to the second station, and at the same time, setting a number of a frame where the third message is transmitted as a second start frame number;
   performing, by each of the first station and the second station, a modulo operation on a frame having the first start frame number or the second start frame number and its succeeding frames using a positive integer for each frame, and detecting a number of a frame where a result value of the modulo operation becomes zero (0); and
   simultaneously updating CID lists of the first station and the second station at a frame having the detected frame number with regard to a connection identifier of the added service flow.

2. The method of claim 1, wherein updating comprises:
   determining if a length of a frame interval from the first start frame number or the second start frame number to a frame number where a result value obtained by performing the modulo operation becomes zero (0), exceeds a threshold; and
   simultaneously updating CID lists of the first station and the second station when the length of the frame interval exceeds the threshold.

3. The method of claim 2, further comprising:
   re-setting a number of the current frame as the first start frame number or the second start frame number when the length of the frame interval is less than or equal to the threshold.

4. A method for synchronizing Connection IDentifiers (CIDs) of a first station and a second station in a communication system, the method comprising:
   sending, by the first station, a first message for requesting deletion of a service flow identified by a connection identifier, to the second station, and at the same time, setting a number of a frame where the first message is transmitted as a first start frame number;
   sending, by the second station, a second message which is a response message to the first message, and at the same time, setting a number of a frame where the second message is transmitted as a second start frame number;
   performing, by each of the first station and the second station, a modulo operation on a frame having the first start frame number or the second start frame number and its succeeding frames using a positive integer for each frame, and detecting a number of a frame where a result value of the modulo operation becomes zero (0); and
   simultaneously updating CID lists of the first station and the second station at a frame having the detected frame number with regard to a connection identifier of the deleted service flow.

5. The method of claim 4, wherein updating comprises:
   determining if a length of a frame interval from the first start frame number or the second start frame number to a frame number where a result value obtained by performing the modulo operation becomes zero (0), exceeds a threshold; and
   simultaneously updating CID lists of the first station and the second station when the length of the frame interval exceeds the threshold.

6. The method of claim 4, further comprising:
   re-setting a number of the current frame as the first start frame number or the second start frame number when the length of the frame interval is less than or equal to the threshold.

7. A system for synchronizing Connection IDentifiers (CIDs) in a communication system, the system comprising:
   a first station; and
   a second station;
   wherein the first station sends a first message for requesting addition of a service flow identified by a connection identifier to the second station;
   wherein the second station sends a second message which is a response message to the first message, and at the same time, sets a number of a frame where the second message is transmitted as a first start frame number;
   wherein the first station sends a third message for acknowledging receipt of the second message to the second station, and at the same time, sets a number of a frame where the third message is transmitted as a second start frame number;
   wherein each of the first station and the second station performs a modulo operation on a frame having the first start frame number or the second start frame number and its succeeding frames using a positive integer for each frame, and detects a number of a frame where a result value of the modulo operation becomes zero (0); and
   wherein the first station and the second station simultaneously update CID lists of the first station and the second station at a frame having the detected frame number with regard to a connection identifier of the added service flow.

8. The system of claim 7, wherein each of the first station and the second station determines if a length of a frame interval from the first start frame number or the second start frame number to a frame number where a result value obtained by performing the modulo operation becomes zero (0), exceeds a threshold, and simultaneously update CID lists of the first station and the second station when the length of the frame interval exceeds the threshold.

9. The system of claim 7, wherein each of the first station and the second station re-sets a number of the current frame as the first start frame number or the second start frame number when the length of the frame interval is less than or equal to the threshold.

10. A system for synchronizing Connection IDentifiers (CIDs) in a communication system, the system comprising:
   a first station; and
   a second station;
   wherein the first station sends a first message for requesting deletion of a service flow identified by a connection identifier to the second station, and at the same time, sets a number of a frame where the first message is transmitted as a first start frame number;
   wherein the second station sends a second message which is a response message to the first message, and at the same time, sets a number of a frame where the second message is transmitted as a second start frame number;
   wherein each of the first station and the second station performs a modulo operation on a frame having the first start frame number or the second start frame number and its succeeding frames using a positive integer for each frame, and detects a number of a frame where a result value of the modulo operation becomes zero (0); and
   wherein the first station and the second station simultaneously update CID lists of the first station and the second station at a frame having the detected frame number with regard to a connection identifier of the deleted service flow.

11. The system of claim 10, wherein each of the first station and the second station determines if a length of a frame interval from the first start frame number or the second start frame number to a frame number where a result value obtained by performing the modulo operation becomes zero (0), exceeds a threshold, and simultaneously update CID lists of the first station and the second station when the length of the frame interval exceeds the threshold.

12. The system of claim 10, wherein each of the first station and the second station re-sets a number of the current frame as the first start frame number or the second start frame number when the length of the frame interval is less than or equal to the threshold.

* * * * *